United States Patent [19]

Engelhardt et al.

[11] Patent Number: 4,543,110
[45] Date of Patent: Sep. 24, 1985

[54] METHOD AND PLANT FOR REHEATING FLUE GASES BEHIND A WET FLUE-GAS DESULFURIZATION PLANT

[75] Inventors: Reiner Engelhardt, Effeltrich; Eberhard Wittchow, Erlangen, both of Fed. Rep. of Germany

[73] Assignee: Kraftwerk Union Aktiengesellschaft, Mülheim, Fed. Rep. of Germany

[21] Appl. No.: 628,247

[22] Filed: Jul. 6, 1984

[30] Foreign Application Priority Data

Jul. 6, 1983 [DE] Fed. Rep. of Germany ....... 3324388

[51] Int. Cl.⁴ ............................................. B01D 53/14
[52] U.S. Cl. .......................................... 55/27; 55/73; 55/222; 55/268; 423/242
[58] Field of Search ............ 55/27, 73, 222, 267–269; 423/242 R, 243

[56] References Cited

U.S. PATENT DOCUMENTS

| | | | |
|---|---|---|---|
| 2,843,217 | 7/1958 | von Linde | 423/242 R X |
| 3,403,496 | 10/1968 | Ahlander et al. | 55/73 |
| 4,043,770 | 8/1977 | Jakob | 55/73 X |
| 4,140,751 | 2/1979 | Vasan | 423/243 |
| 4,185,071 | 1/1980 | Sujdak | 423/242 R |
| 4,291,003 | 9/1981 | Batteux et al. | 423/243 X |
| 4,297,332 | 10/1981 | Tatani et al. | 55/73 X |
| 4,298,497 | 11/1981 | Colombo | 423/242 R X |

FOREIGN PATENT DOCUMENTS 1551878  7/1970  Fed. Rep. of Germany .

*Primary Examiner*—Robert Spitzer
*Attorney, Agent, or Firm*—Herbert L. Lerner; Laurence A. Greenberg

[57] ABSTRACT

Reheating flue gas behind a wet flue gas desulfurization plant, in which the desulfurized flue gas is admixed with fresh air which had been warmed up first together with the fresh air intended for the combustion, in a heat exchanger by a third medium, then by the flue gas air preheater, by the flue gas flowing into the flue gas desulfurization plant without the temperature falling below the dew point temperature of the flue gas before it enters into the flue gas desulfurization plant.

4 Claims, 4 Drawing Figures

METHOD AND PLANT FOR REHEATING FLUE GASES BEHIND A WET FLUE-GAS DESULFURIZATION PLANT

BACKGROUND OF THE INVENTION

1. Field of the Invention

The invention relates to a method and a plant for reheating flue gas behind a wet flue-gas desulfurization plant.

2. Description of the Prior Art

In known plants for wet flue-gas desulfurization of flue gas containing gaseous sulfur compounds, the flue gas is cooled down to a flue gas exit temperature of about 45° C., depending on the method. This temperature is distinctly lower than that temperature which is indispensible for maintaining the required buoyancy in the chimney. It is also below the dew point. The purified flue gas, also called "pure gas", which flows out of the flue-gas desulfurization plant carries with it small acidulated water droplets which lead to corrosion in all following components.

In order to improve the buoyancy in the chimney and to evaporate the water droplets in the flue gas it is known to reheat the purified gas flowing out of the flue-gas desulfurization plant at a temperature of about 45°, with energy from an external source. In this process considerable sums must be spent for energy cost.

It is also known to heat the purified gas flowing out of the flue-gas desulfurization plant by bypassing part of the hot undesulfurized flue gas which normally flows through the flue-gas desulfurization plant and mixing the hot bypassed gas with the purified gas which leaves the flue-gas desulfurization plant. This method can be performed at relatively low costs. However, it leads to SO$_2$ emission values which are above the permissible emission value for most coal types.

A plant for reheating flue gas behind a wet flue-gas desulfurization plant has also become known, in which the flue gas is first conducted through a flue gas-air preheater, subsequently to a flue gas dust separation plant and, before it is conducted into a flue-gas desulfurization plant, through a raw gas/purified gas heat exchanger. In the latter, it is first cooled down to about 60° to 80° C. and, after the flue gas sulfur separation, is reheated to about 90° C. This plant operates with only small thermal losses and also generates a sufficiently strong buoyancy in the chimney. However, due to the fact that the temperature is below the dew point, corrosion and contamination in the raw gas/pure gas heat exchanger is considerable.

It has also been proposed to conduct the flue gas through a flue gas air preheater, an electrofilter, a cold air preheater into the flue-gas desulfurization plant and to admix part of the fresh air which had been preheated in the cold air preheater and then in the flue gas/air preheater to the purified gas flowing into the chimney. This plant, which brings with it good utilization of the thermal energy of the flue gas, requires considerable investment for the fabrication of the different additional components. Because the temperature is below the dew point, considerable corrosion must be expected here in the cold air preheater.

SUMMARY OF THE INVENTION

An object of the invention is to provide a method for reheating the flue gas behind a flue-gas desulfurization plant with a minimum of losses and without subjecting the components used for this purpose to corrosive influences.

With the foregoing and other objects in view, there is provided in accordance with the invention a method for reheating flue gas which flows via a flue gas line into a wet gas desulfurization plant wherein the flue gas is desulfurized and cooled which comprises, admixing fresh air with the desulfurized flue gas, said fresh air, prior to said admixing, together with fresh air to be used for combustion to form flue gas is preheated by a third heating medium in a heat exchanger, the preheated fresh air from the heat exchanger thereafter flows through a flue gas-air preheater wherein preheated fresh air is further heated by heat exchange with the flue gas flowing into the flue gas desulfurization plant without the temperature falling below the dew point temperature of the flue gas before it enters the flue gas desulfurization plant.

In accordance with the invention there is further provided a plant for reheating flue gas behind a wet flue-gas desulfurization plant comprising a flue gas line through which flue gas flows, interposed in the flue gas line and connected in series are a single flue gas-air preheater wherein air passes in heat exchange with hot flue gas cooling the flue gas to maximally the dew point, a wet flue gas desulfurization plant for removal of sulfur compounds in the flue gas, and a chimney for the discharge of desulfurized flue gas into the atmosphere; also connected in series are a fresh air blower for suctioning in air from the atmosphere, a heat exchanger wherein said fresh air is preheated by a third medium, said flue-gas-air preheater wherein the preheated air is further heated, and a fresh air line from the flue gas-air preheater to a combustion chamber for supplying air for combustion; a hot air line branches off from the fresh air line between the flue gas-air preheater and the combustion chamber and opens into the flue gas line between the flue gas desulfurization plant and the chimney to supply hot air to the desulfurized flue gas.

Other features which are considered as characteristic for the invention are set forth in the appended claims.

Although the invention is illustrated and described herein as embodied in a method and plant for reheating flue gases behind a wet flue-gas desulfurization plant, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings, in which.

DETAILED DESCRIPTION OF THE INVENTION

Figure 1:
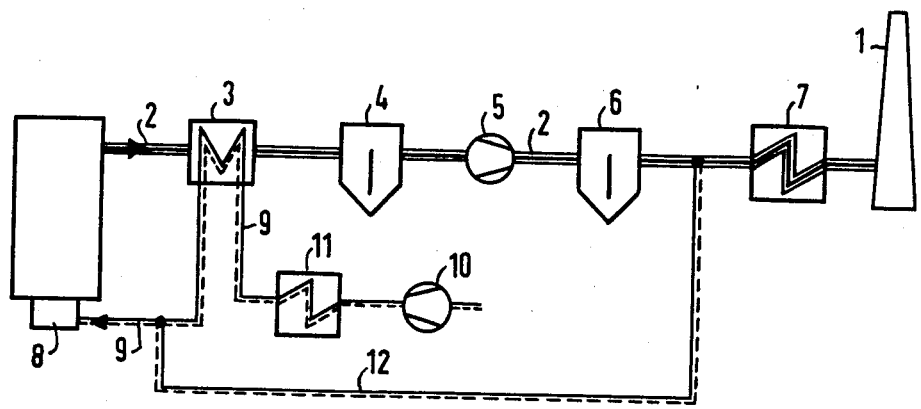
FIG. 1 diagrammatically illustrates a plant, according to the invention, for reheating flue gas behind a wet flue-gas desulfurization plant.

In one method of the type mentioned at the outset, fresh air is admixed to the desulfurized flue gas. However, this fresh air for admixture with the desulfurized flue gas was preheated together with fresh air intended for combustion in a heat exchanger by a third medium. The thus preheated air from this heat exchanger flows through a flue gas-air preheater in heat exchange with the flue gas flowing into the flue-gas desulfurization plant without the temperature of the flue gas falling below the dew point temperature of the flue gas before it enters into the flue-gas desulfurization plant. This procedure avoids the need that the purified flue gases provided with water droplets are warmed up by heating surfaces which, according to experience, get contaminated and corroded quickly. At the same time, the cold air preheater or the raw gas/pure gas preheater previously used are unnecessary and their non-use represents a saving in capital investment.

An increase of the overall efficiency in the reheating of purified flue gas can be achieved if, in a practical further embodiment of the invention, part of the heated fresh air is returned from the exit of the flue gas/air preheater to the input of the heat exchanger heated by the third medium. This results in a higher air entrance temperature of the air-side input of the flue gas/air preheater and/or in savings of the heat which has otherwise to be supplied by the third medium. A higher air entrance temperature of the air-side input of the flue gas-air preheater permits more effective cooling of the flue gas without the temperature falling below the dew point in parts of the flue gas-air preheater.

Further details of the invention will be explained with the aid of embodiment examples shown in the drawings.

In the schematic presentation of FIG. 1, it is seen that, in the flue gas line 2 leading to the chimney 1 there are arranged in the flow direction of the flue gas, in series with each other, a rotary air preheater 3 as the flue gas-air preheater, a flue gas dust separation plant 4, a suction blower 5, a flue gas desulfurization plant 6, and a steam heated auxiliary heat exchanger 7 which can alternatively also be heated by flue gas. In the fresh-air line 9 leading to the combustion chamber 8, a fresh air blower 10, a steam-heated air preheater 11 and the flue gas-air preheater 3 are connected in series. From the fresh air line 9, between the rotary preheater 3 and the combustion chamber 8, a hot airline 12 is branched off which opens into the flue gas line 2 between the flue gas desulfurization plant 6 and the auxiliary heat exchanger 7.

In this plant for reheating flue gas behind (downstream-based on the flow of the flue gas to the chimney) a wet flue gas desulfurization plant, the flue gas is cooled-down in the rotary air preheater 3, for instance from about 410° to about 120°. This cooled-down flue gas is transported by the suction blower 5 through the dust separation filter 4 and the wet flue gas desulfurization plant 6. In the wet flue gas desulfurization plant, the flue gas is cooled-down to about 45° C., but may vary somewhat depending on the particular desulfurization method. This value is far below the dew point and also below that temperature which is required for the development of a sufficient buoyancy in the chimney 1. The fresh air, simultaneously drawn-in from the outside atmosphere by the fresh air blower 10 is heated in this plant in the steam-heated air preheater 11 to approximately 60° to 70° C. and conducted into the rotary air preheater 3. There, it is heated to about 350° C. and is transported at this temperature into the combustion chamber 8 for the purpose of burning a fuel, frequently to heat a boiler. The fuel is usually derived from fossil fuel and may be solid, liquid or gaseous such as coal, liquid petroleum fraction or natural gas. The products of combustion contain sulfur compounds such as $H_2S$ and $SO_2$, derived usually from the fuel burned, and it is these sulfur compounds which are to be removed by wet flue gas desulfurization before sending the flue gas to the chimney and discharging it into the atmosphere. Approximately 11% of this heated fresh air are admixed via the hot air line 12 to the purified flue gases leaving the flue gas desulfurization plant 6 and heat up the latter to about 75° C. This value is above dew point and makes possible the buoyancy in the chimney 1 which is just sufficient.

To improve the buoyancy in the chimney, the flue gas can be heated further via the auxiliary heat exchanger 7. For this purpose, the exhaust steam of a steam tubrine or another steam consumer or preheated water or hot raw gas can be fed into the auxiliary heat exchanger 7. With this auxiliary heat exchanger there is no danger of corrosion or contamination because the temperature of the inflowing flue gas is already above the dew point due to the admixture of hot air. This auxiliary heat exchanger 7, in which the flue gas can be heated by the exhaust heat from the power generating station to above 100° C., ensures a sufficient buoyancy in the chimney 1 during the starting up of the plant and at times of low load.

Figure 2:
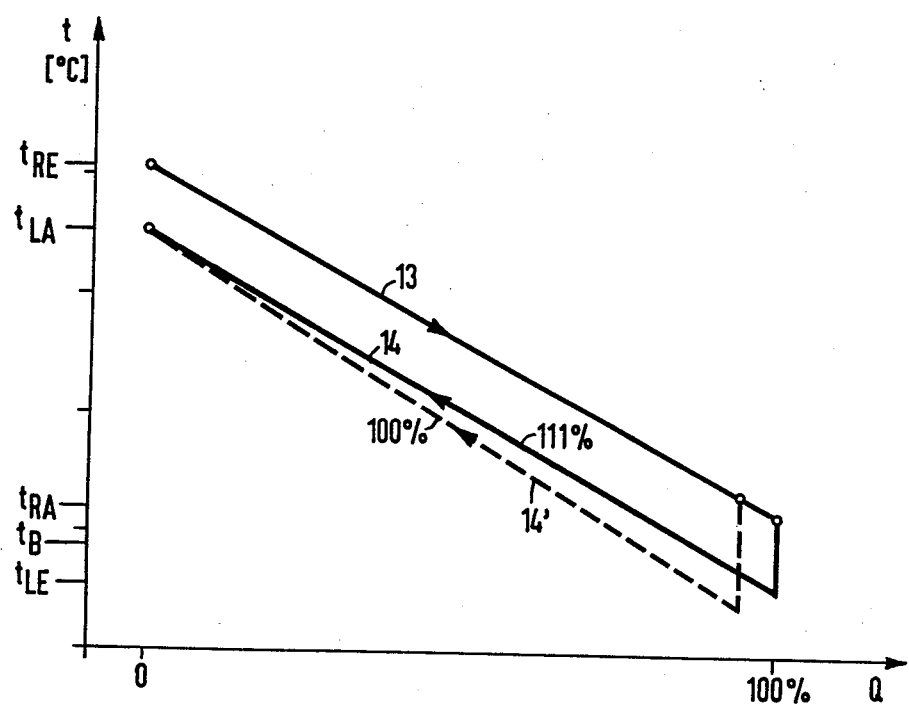
FIG. 2 is a diagram of the temperature conditions prevailing in the flue gas/air preheater of FIG. 1, FIG. 3, is another embodiment of the plant, in accordance with the invention, for reheating of flue gas behind a wet flue-gas desulfurization plant.

FIG. 2 shows the temperature $\theta$ as a function of the transferred amount of heat Q in the rotary air preheater 3 of FIG. 1. In this latter, the flue gas 13 flows in a direction opposite that of the fresh air 14. In the normal case, i.e. if only the combustion air is heated in the flue gas air preheater, which flows toward the combustion chamber 8, see dashed curve 14' of FIG. 2 and curve 30' of FIG. 4, then the temperature difference between the flue gas and the air on the hot side of the flue gas-air preheater is always distinctly smaller than that on the cold side. The fresh air heats up faster because of a lower water value, i.e. the product of mass flow and specific heat, then does the flue gas 13 because of its greater water content. In the embodiment example of FIG. 1, 111% of the combustion air are conducted into the rotary air preheater 3 because of the admixture of hot air. There, flue gas 13 enters the rotary air preheater 3 with a temperature $t_{RE}=410°$ C. and leaves it with a temperature $t_{RA}=120°$ C. The fresh air 14 is introduced into the rotary air preheater 3 with a temperature of $t_{LE}=60°$ and leaves it with an exit temperature $t_{LA}=350°$ C. The slopes of the two temperature curves 13 and 14 are still different.

$t_B$ in FIG. 2 indicates the sheet metal temperature which is important with respect to the corrosion on the cold side of the rotary air preheater. It is approximately in the middle between the air input temperature $t_{LE}$ and the flue gas exit temperature $t_{RA}$ and therefore follows approximately the equation $$t_B = (t_{LE} + t_{RA})/2$$

This sheet metal temperature must not be below the dew point if corrosion and contamination to be avoided, and should therefore not be lower than in general 90° C. As a result, the flue gas must not be cooled down below 120° C. for an air entrance temperature of 60° C. If the air would be allowed to enter into the rotary air preheater 3 without preheating at about 45° C., then the flue gases must not be cooled-down below 135° C. because otherwise, the sheet metal temperature $t_B$ at the cooled end of the rotary air preheater would fall below 90° C. The exhaust gas losses, however, are smaller, as is well known, as more heat is removed from the flue gases before they enter into the flue gas desulfurization plant. For this reason, the air preheater 11 heated by a third medium is used for the purpose of removing more heat from the flue gases in the rotary air preheater 3, without falling below the dew point.

Figure 3:
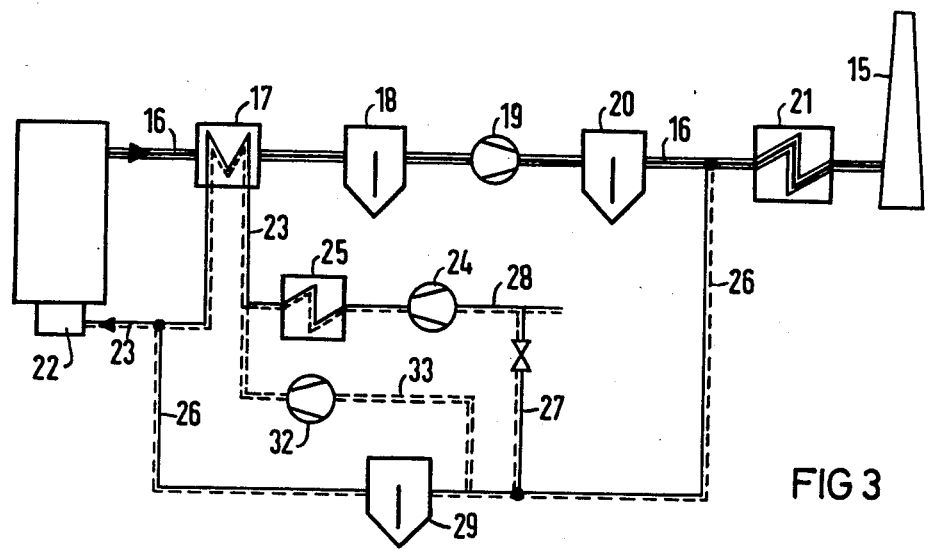

FIG. 3 shows a plant, somewhat changed from the embodiment example of FIG. 1, for reheating the flue gas behind a wet flue gas desulfurization plant. In this plant, as in the plant of FIG. 1 discussed above, are arranged in the flue gas line 16 leading to the chimney 15, in series, a rotary air preheater 17 as the flue gas air preheater, a flue gas dust separation plant 18, a suction blower 19, a flue gas desulfurization plant 20 and a steam or flue gas-heated auxiliary heat exchanger 21. Also on the fresh air side, there are arranged in the fresh air line 23 leading to the combustion chamber 22, in series with a fresh air blower 24, a steam heated air preheater 25 and the rotary air preheater 17. From the fresh air line 23 is branched off between the rotary air preheater and the combustion chamber, a hot air line 26 which opens into the flue gas line 16 leading from the flue gas desulfurization plant 20 to the auxiliary heat exchanger 21. In contrast to the plant according to FIG. 1, the hot air line 26, however, contains a hot air return line 27 which opens into the suction channel 28 of the fresh air blower 24. Furthermore, a second dust separation plant 29 is built into the hot air line 26. The hot air which is separated from the combustion air is about 8 to 25% by volume based on the volume of combustion air.

In this plant for reheating flue gas, heat is first removed from the flue gas in the rotary preheater 17, similarly to what has been described with the aid of the embodiment example of FIG. 1. For this purpose, hot fresh air is admixed to the pure gas later, after dust and sulfur separation, and thus its temperature is raised above the dew point. Further heat for increasing the buoyancy in the chimney can be transferred to this reheated pure gas via the auxiliary heat exchanger 21.

Figure 4:
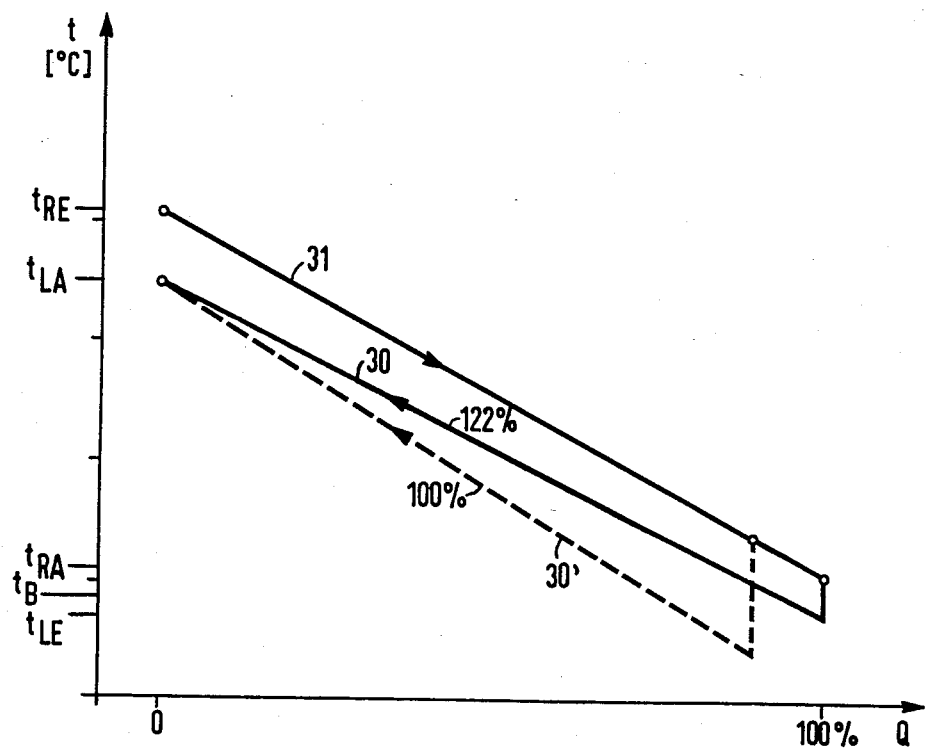
FIG. 4 is a diagram of the temperature conditions prevailing at the flue gas-air preheater of FIG. 3.

Differing from the embodiment example of FIG. 1, part of the hot air generated, however, is returned into the suction channel 28 of the fresh air blower 24. In this manner, the fresh air on the suction side is previously warmed up. The fresh air throughput through the steam-heated air preheater 25 and the rotary air preheater 17 is increased by this recirculating portion of hot air. The result of this, as the diagram in FIG. 4 shows, is that the fresh air 30, now flowing into the rotary air preheater 17 is increased by about 11% as compared to the embodiment example of FIGS. 1 and 2 and is heated up less rapidly for an unchanged, i.e. constant quantity of flue gas. This means that the slope of the fresh air temperature curve in FIG. 4 is less steep than in FIG. 2. With a suitable increase of the recirculating fresh air stream, it becomes equally steep or even somewhat flatter than the temperature of the flue gas 31 which flows in the opposite direction.

Assuming in the embodiment example of FIG. 4 again a flue gas entrance temperature of $t_{RE}=410°$ C. and a fresh air exit temperature $t_{LA}$ of 350° C., the flue gas exit temperature $t_{RA}$ and the fresh air entrance temperature $t_{LE}$ are closer together. With a sheet metal temperature $t_B=90°$ C., this leads to an air entrance temperature of $t_{LE}=70°$ C. and to a flue gas entrance temperature $t_{RA}=110°$ C. This means more heat can be removed from the flue gas than in the embodiment of FIGS. 1 and 2, without the temperature being lower than 90° C. and therefore below the dew point. This greater cooling-down of the flue gas in the rotary air preheater 17, however, leads to an increased efficiency of the overall plant, because the heating of air preheater 25 by the third medium can be reduced due to the better utilization of the flue gas heat. The flue gas dust separation plant 29 built into the hot air line 26 serves to remove the ash transported in the rotary air preheater 17 from the flue gas side to the air side.

In the plant shown in FIG. 3 for reheating flue gas, the hot air return line 33 which is equipped with a blower 32 and shown by dashed lines can be used instead of the hot air return line 27. In this procedure, an improved heat transfer in the air preheater 25 is counter-acted by the increased cost of the blower 32.

The foregoing is a description corresponding, in substance to German application No. P 33 24 388.3, dated July 6, 1983, international priority of which is being claimed for the instant application, and which is hereby made part of this application. Any material discrepancies between the foregoing specification and the specification of the aforementioned corresponding German application are to be resolved in favor of the latter.

There is claimed:

1. Method for reheating flue gas which flows via a flue gas line into a wet gas desulfurization plant wherein the flue gas is desulfurized and cooled which comprises, admixing fresh air with the desulfurized flue gas, said fresh air, prior to said admixing, together with fresh air to be used for combustion to form flue gas is preheated by a third heating medium in a heat exchanger, the preheated fresh air from the heat exchanger thereafter flows through a flue gas-air preheater wherein preheated fresh air is further heated by heat exchange with the flue gas flowing into the flue gas desulfurization plant without the temperature falling below the dew point temperature of the flue gas before it enters the flue gas desulfurization plant, and wherein part of the heated fresh air is returned from the exit of the flue gas-air preheater to the input of the heat exchanger which is heated by the third medium.

2. Method for reheating flue gas which flows via a flue gas line into a wet gas desulfurization plant wherein the flue gas is desulfurized and cooled which comprises, admixing fresh air with the desulfurized flue gas, said fresh air, prior to said admixing, together with fresh air to be used for combustion to form flue gas is preheated by a third heating medium in a heat exchanger, the preheated fresh air from the heat exchanger thereafter flows through a flue gas-air preheater wherein preheated fresh air is further heated by heat exchange with the flue gas flowing into the flue gas desulfurization plant without the temperature falling below the dew point temperature of the flue gas before it enters the flue gas desulfurization plant, wherein the fresh air subjected to said preheating and further heating contains combustion air and in addition about 8 to 25% by volume fresh air based on the volume of the combustion air, and wherein a portion of the heated fresh air from the flue gas-air preheater is admixed to the desulfurized flue gas for reheating, said portion constituting about 8 to 25% by volume fresh air based on the volume of the combustion air.

3. A plant for reheating flue gas behind a wet flue-gas desulfurization plant comprising, a flue gas line through which flue gas flows, interposed in the flue gas line and connected in series are a single flue gas-air preheater wherein air passes in heat exchange with hot flue gas cooling the flue gas to maximally the dew point, a wet flue gas desulfurization plant for removal of sulfur compounds in the flue gas, and a chimney for the discharge of desulfurized flue gas into the atmosphere; also connected in series are a fresh air blower for suctioning in air from the atmosphere, a heat exchanger wherein said fresh air is preheated by a third medium, said flue-gas-air preheater wherein the preheated air is further heated, and a fresh air line from the flue-gas-air preheater to a combustion chamber for supplying air for combustion; a hot air line branches off from the fresh air line between the flue-gas-air preheater and the combustion chamber and opens into the flue gas line between the flue gas desulfurization plant and the chimney to supply hot air to the desulfurized flue gas, and a recirculating line connected to the hot air line leading to the suction side of the fresh air blower for recirculation of a portion of the air.

4. A plant for reheating flue gas behind a wet flue-gas desulfurization plant comprising, a flue gas line through which flue gas flows, interposed in the flue gas line and connected in series are a single flue-gas-air preheater wherein air passes in heat exchange with hot flue gas cooling the flue gas to maximally the dew point, a wet flue gas desulfurization plant for removal of sulfur compounds in the flue gas, and a chimney for the discharge of desulfurized flue gas into the atmosphere; also connected in series are a fresh air blower for suctioning in air from the atmosphere, a heat exchanger wherein said fresh air is preheated by a third medium, said flue-gas-air preheater wherein the preheated air is further heated, and a fresh air line from the flue-gas-air preheater to a combustion chamber for supplying air for combustion; a hot air line branches off from the fresh air line between the flue-gas-air preheater and the combustion chamber and opens into the flue gas line between the flue gas desulfurization plant and the chimney to supply hot air to the desulfurized flue gas, and wherein part of the heated fresh air is returned from the exit of the flue-gas-air preheater through a hot air return line into the air-side entrance of the flue-gas-air preheater.

* * * * *